United States Patent
Satoh

(10) Patent No.: US 9,930,254 B2
(45) Date of Patent: Mar. 27, 2018

(54) OPTICAL SYSTEM AND IMAGING SYSTEM INCORPORATING THE SAME

(71) Applicant: Hiroyuki Satoh, Kanagawa (JP)

(72) Inventor: Hiroyuki Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 173 days.

(21) Appl. No.: 15/137,404

(22) Filed: Apr. 25, 2016

(65) Prior Publication Data
US 2016/0353020 A1 Dec. 1, 2016

(30) Foreign Application Priority Data
May 25, 2015 (JP) .................................. 2015-105614

(51) Int. Cl.
| | |
|---|---|
| *H04N 5/232* | (2006.01) |
| *G02B 13/06* | (2006.01) |
| *H04N 5/225* | (2006.01) |
| *G02B 5/04* | (2006.01) |

(52) U.S. Cl.
CPC ......... *H04N 5/23238* (2013.01); *G02B 13/06* (2013.01); *H04N 5/2254* (2013.01); *H04N 5/2258* (2013.01); *G02B 5/04* (2013.01)

(58) Field of Classification Search
CPC ............. H04N 5/23238; H04N 5/2254; H04N 5/2258; G02B 13/06; G02B 5/04
See application file for complete search history.

(56) References Cited

U.S. PATENT DOCUMENTS

| | | | |
|---|---|---|---|
| 2013/0050405 A1* | 2/2013 | Masuda ................ | G02B 13/06 348/36 |
| 2013/0050408 A1 | 2/2013 | Masuda et al. | |
| 2013/0242040 A1* | 9/2013 | Masuda ............... | H04N 5/2251 348/36 |
| 2014/0071226 A1* | 3/2014 | Satoh ................. | G02B 13/0065 348/36 |
| 2014/0132709 A1* | 5/2014 | Satoh .................. | G02B 19/008 348/36 |
| 2015/0015664 A1 | 1/2015 | Masuda et al. | |
| 2015/0015766 A1 | 1/2015 | Satoh et al. | |
| 2015/0192762 A1 | 7/2015 | Satoh et al. | |
| 2015/0301316 A1 | 10/2015 | Masuda et al. | |
| 2016/0006907 A1 | 1/2016 | Masuda et al. | |

FOREIGN PATENT DOCUMENTS

JP 2013-045089 3/2013

* cited by examiner

*Primary Examiner* — Zhihan Zhou
(74) *Attorney, Agent, or Firm* — Oblon, McClelland, Maier & Neustadt, L.L.P.

(57) ABSTRACT

An optical system including a plurality of wide angle lenses, each having a peripheral area with a decreased magnification per unit angle of view and an inside area ranging from an optical axis to an inside edge of the peripheral area. The inside area includes a first area ranging from the optical axis toward the peripheral area, the first area having a constant magnification per unit angle of view and a second area ranging from an outside edge of the first area to the inside edge of the peripheral area. The second area has a magnification per unit angle of view that continuously varies in a direction from the outside edge of the first area toward the peripheral area. An image portion formed by the peripheral area overlaps with another image portion formed by the peripheral area of another wide angle lens.

9 Claims, 7 Drawing Sheets

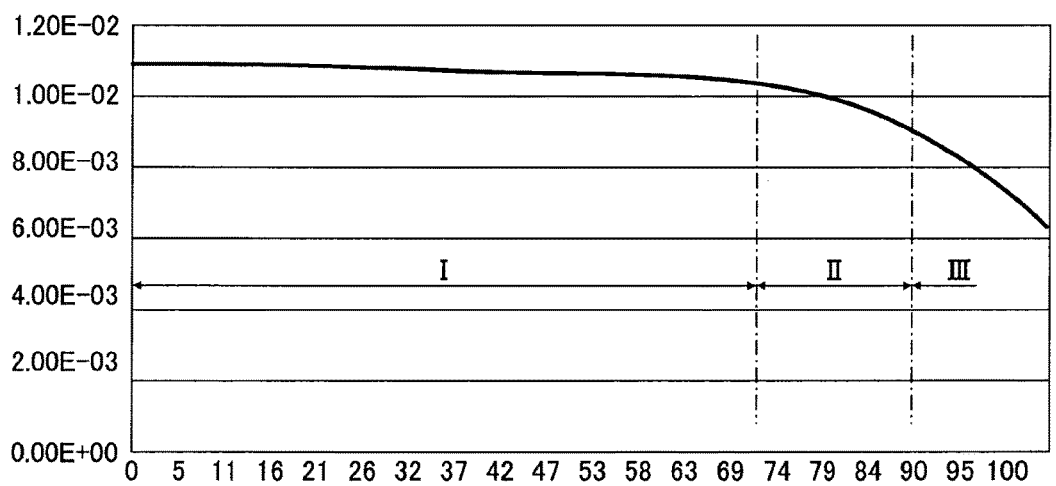
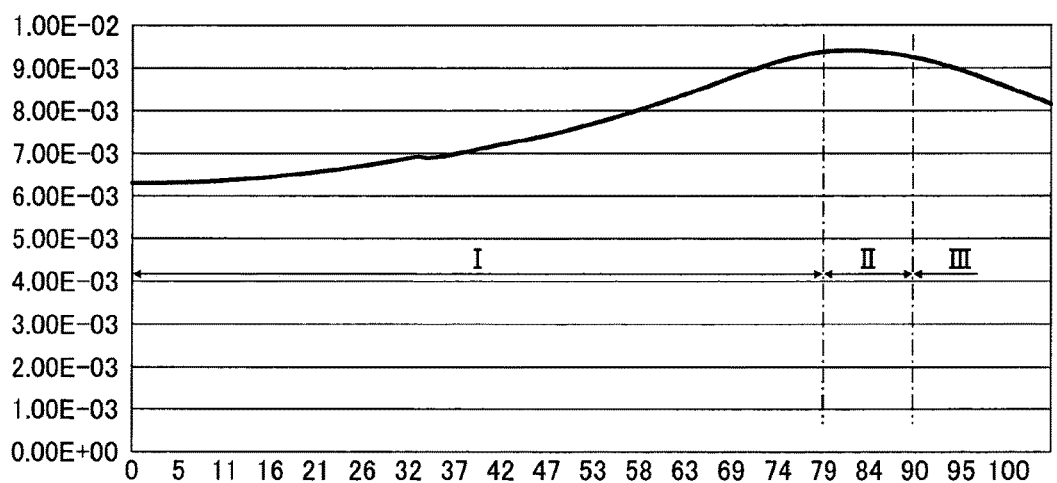

OPTICAL SYSTEM AND IMAGING SYSTEM INCORPORATING THE SAME

CROSS-REFERENCE TO RELATED APPLICATION

This patent application is based on and claims priority pursuant to 35 U.S.C. § 119(a) to Japanese Patent Application No. 2015-105614, filed on May 25, 2015, in the Japan Patent Office, the entire disclosure of which is hereby incorporated by reference herein.

BACKGROUND

Technical Field

Exemplary aspects of the present disclosure generally relate to an optical system and an imaging device incorporating the optical system.

Related Art

An imaging system including a plurality of wide angle lenses is known, in which the respective wide angle lenses form subject images with the peripheral portions of the respective images overlapping each other, thereby joining the subject images together to obtain a wide view image. Such an imaging system is used in a spherical imaging system, for example.

Wide angle lenses, which are also called fish-eye lenses, have four projection methods, such as an orthogonal projection, an equisolid angle projection, an equidistance projection, and a stereographic projection. The orthogonal projection and equisolid angle projection have been widely adopted in fish eye lenses for silver salt cameras. The stereographic projection is suitable for recent digital cameras to improve resolutions in the peripheral portions accompanying advance in image processing technology. In addition, to achieve a good balance between axial and off-axial resolutions, the equidistance projection is suitably applied. In such cases, however, one fish-eye lens is used alone, unlike in the spherical imaging system described above that includes a plurality of fish-eye lenses combined.

SUMMARY

In an aspect of this disclosure, there is provided an improved optical system including a plurality of wide angle lenses to form subject images, each wide angle lens having a peripheral area with a decreased image forming magnification per unit angle of view and an inside area ranging from an optical axis to an inside edge of the peripheral area. The inside area includes a first area ranging from the optical axis toward the peripheral area, the first area having a constant image forming magnification per unit angle of view and a second area ranging from an outside edge of the first area to the inside edge of the peripheral area. The second area has an image forming magnification per unit angle of view that continuously varies in a direction from the outside edge of the first area toward the peripheral area. An image portion formed by the peripheral area of a wide angle lens of the plurality of wide angle lenses overlaps with another image portion formed by the peripheral area of another wide angle lens of the plurality of wide angle lenses. An image portion formed by the inside area of the wide angle lens does not overlap with another image portion formed by the inside area of said another wide angle lens.

In another aspect of this disclosure, there is provided another improved imaging system, including the optical system described above and an image sensor to convert light having passed through the optical system into an electrical signal to generate an imaged image.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 7 is a diagram of an image forming magnification per unit angle of view of the wide angle lens used as a specific example in the optical system of the imaging system;

FIG. 8 is a diagram of an image forming magnification per unit angle of view of a wide angle lens used as a comparative example in the optical system of the imaging system;

Figure 1:
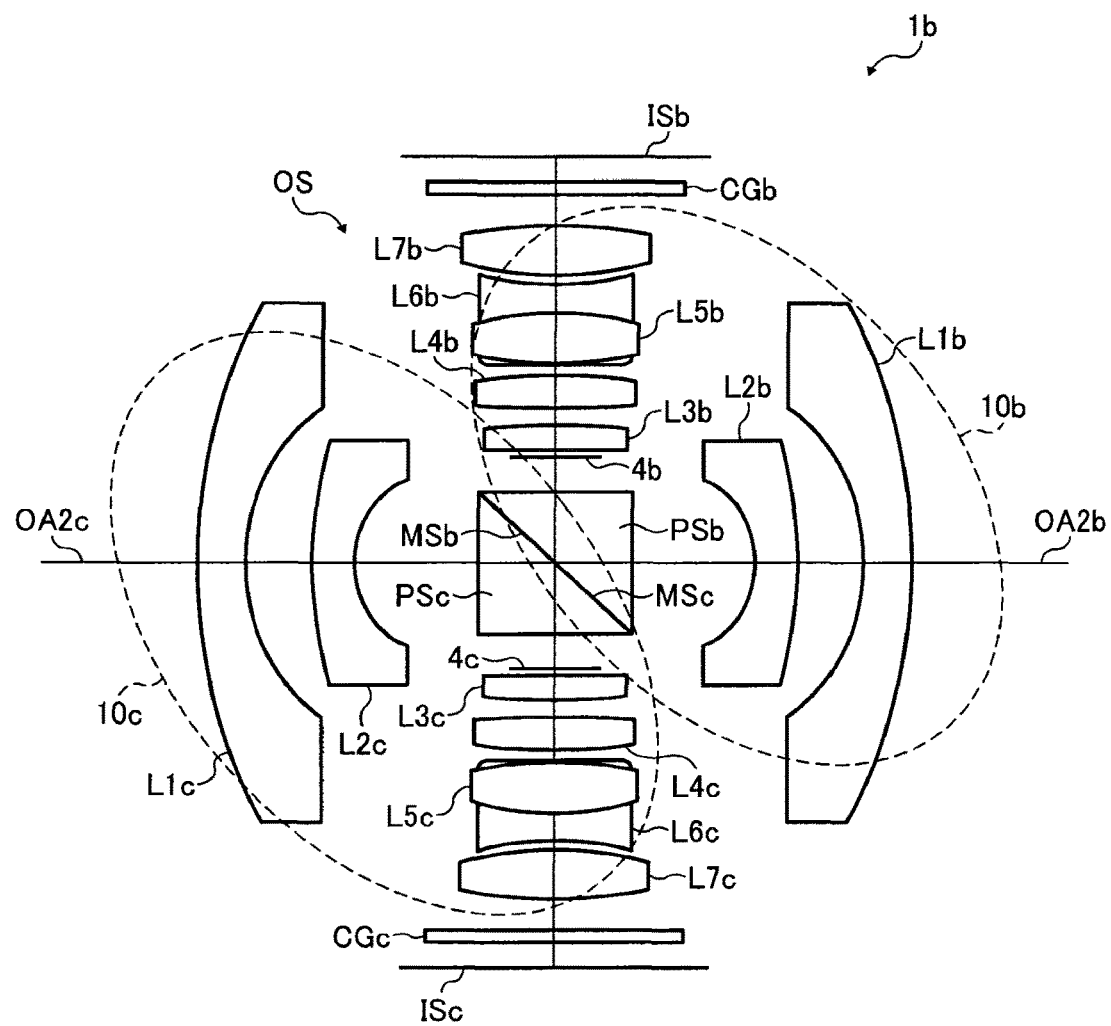
FIG. 1 is a view of an imaging system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components)

having the same function or shape and redundant descriptions thereof are omitted below.

A description is provided of embodiments below.

FIG. 1 is a view of an imaging system according to a first embodiment.

In FIG. 1, reference numeral "1b" denotes the imaging system according to the first embodiment.

The imaging system 1b is a "full spherical imaging system" including two wide angle lenses.

As illustrated in FIG. 1, the imaging system 1b includes a first wide angle lens 10b, a first cover glass CGb, a first image sensor ISb, a second wide angle lens 10c, a second cover glass CGc, and a second image sensor ISc.

The first wide angle lens 10b and the second wide angle lens 10c are of the "same technical specification (spec.)". A description of the first wide angle lens 10b is given below. In this case, the reference numerals in parentheses refer to the corresponding elements of the second wide angle lens 10c, respectively.

The first wide angle lens 10b (10c) includes a "front group, a rear group, an aperture, and a prism".

The "front group" consists of two negative meniscus lenses L1b (L1c) and L2b (L2c), having a negative refractive power as a whole. The front group receives rays with a wide angle of view greater than 180 degrees.

The "rear group" consists of five lenses, that is, a lens L3b (L3c), a lens L4b (L4c), a lens L5b (L5c), a lens L6b (L6c), and a lens L7b (L7c), which are disposed in this order toward the image side (the image sensor side).

The prism PSb (PSc) is disposed between the front group and the rear group. The optical axis OA2b (OA2c) of the front group is bent by 90 degrees. That is, the optical axis of the rear group is perpendicular to the optical axis OA2b (OA2c) of the front group, and to a light receiving surface of the image sensor ISb (ISc).

The prism PSb (PSc) is a right-angle prism having a slanted surface formed with a reflection surface MSb (MSc). The prism PSb and the prism Psc are integrated with each other, having the reflection surface MSb in contact with the reflection surface MSc.

Among the lenses L3b (L3c), L5b (L5c), L6b (L6c), and L7b (L7c) that constitute the rear group, the lens L3b (L3c) is disposed closest to the prism PSb (PSc). An aperture 4b (4c) is disposed in contact with the prism-side surface of the lens L3b (L3c).

Among the lenses L3b (L3c), L4b (L4c), L5b (L5c), L6b (L6c), and L7b (L7c) that constitute the rear group, the lenses L4b (L4c) is a "biconvex lens".

The lens L5b (L5c) is a "biconvex lens", and the lens L6b (L6c) is a "biconcave lens". The lens L5b (L5c) as the biconvex lens is cemented to the lens L6b (L6c) as the biconcave lens.

The most-image-side lens L7b (L7c) is a "biconvex lens".

Table 1 below represents one example of data regarding the wide angle lens 10b (10c) of FIG. 1.

TABLE 1

| Surface Numbers | Types | Radii of Curvature | Thicknesses | Refractive Indices | Abbe Numbers |
|---|---|---|---|---|---|
| 1 | Spherical Surface | 17.08 | 1.2 | 1.882997 | 40.76511 |
| 2 | Spherical Surface | 6.19 | 2.7 | | |
| 3 | Aspherical Surface | 26.3 | 0.8 | 1.882023 | 37.2213 |

TABLE 1-continued

| Surface Numbers | Types | Radii of Curvature | Thicknesses | Refractive Indices | Abbe Numbers |
|---|---|---|---|---|---|
| 4 | Aspherical Surface | 3.26 | 4.23 | | |
| 5 | — | Infinity | 5 | 1.834 | 37.16049 |
| 6 | — | Infinity | 1.54 | | |
| Aperture | — | Infinity | 0 | | |
| 8 | Spherical Surface | 12.2 | 1 | 1.84666 | 23.77794 |
| 9 | Spherical Surface | −21.46 | 0.51 | | |
| 10 | Aspherical Surface | 9.85 | 1.23 | 1.6935 | 53.20078 |
| 11 | Aspherical Surface | −11.58 | 0.35 | | |
| 12 | Spherical Surface | 6.57 | 2 | 1.744002 | 44.71997 |
| 13 | Spherical Surface | −3.64 | 0.74 | 1.945945 | 17.98426 |
| 14 | Spherical Surface | 3.69 | 0.36 | | |
| 15 | Aspherical Surface | 4.43 | 1.87 | 1.58913 | 61.25089 |
| 16 | Aspherical Surface | −7.46 | 0.9 | | |
| 17 | — | Infinity | 0.5 | 1.51633 | 64.14202 |
| 18 | — | Infinity | 0.5 | | |

In Table 1, "Surface Numbers" refers to the numbers of lens surfaces sequentially numbered from the object side. Surface number 7 corresponds to "surface of the aperture". "Types" refers to the types of lens surfaces, such as a "spherical surface" and an "aspherical surface". "Thicknesses" refers to the distances between lens surfaces. "Refractive indices" and "Abbe numbers" respectively refer to refractive indices and the Abbe numbers of lens material with respect to a sodium D line. The "radius of curvature" of an aspherical surface is a "paraxial radius of curvature". The unit of length, which is a dimension, is mm unless otherwise mentioned.

In Table 1, surface numbers 3, 4, 10, 11, 15, and 16 of the lenses used in the wide angle lens are all aspherical surfaces. Data regarding the aspherical surfaces is shown below.

Aspherical surface is expressed by the following formula.

$$X=(H^2/R)/[1+\{1-K(H/r)^2\}^{1/2}]+C4 \cdot H^4+C6 \cdot H^6+C8 \cdot H^8+C10 \cdot H^{10}+\ldots$$

In the formula, X denotes a displacement along the direction of the optical axis at a position of a height H from the optical axis to the peak of a surface. K denotes a constant of the cone, and "C4, C6, C8, C10 . . . " refer to aspherical surface coefficients. R refers to a "paraxial radius of curvature".

In Table 1, regarding each of the aspherical surfaces (surface numbers 3, 4, 10, 11, 15, and 16) of the lenses used in the wide angle lens, K (constant of the cone) is 0. Accordingly, $X=(H^2/2R)+C4 \cdot H^4+C6 \cdot H^6+C8 \cdot H^8+C10 \cdot H^{10} \ldots$ . X, which denotes the shape of an aspherical surface, is defined by a value of "paraxial radius of curvature" shown in Table 1 and aspherical surface coefficients. Data regarding the respective aspherical surfaces is shown below.

[Data Regarding Aspherical Surface]

Surface number 3: C4=0.002491, C8=4.63×10⁻⁷.

Surface number 4: C4=0.003451, C6=0.000504, and C10=1.45×10⁻⁵.

Surface number 10: C4=−0.00235, and C6=−0.00025.

Surface number 11: C4=−0.00217, and C6=−0.00028.

Surface number 15: C4=−0.00167, C6=−0.00031, C8=3.07×10⁻⁵, and C10=3.12×10⁻⁵.

Surface number 16: C4=0.004209, C6=−0.00141, C8=0.000474, and C12=2.02×10⁻⁶.

The asperical surface coefficients for orders not listed in the respective surface numbers are all 0.

Wide angle lenses satisfying the data shown in Table 1 and data regarding the aspherical surfaces described above are referred to as a "wide angle lens as a specific example (which is also referred to as a specific wide angle lens)".

Regarding a specific wide angle lens 10b (10c), a full angle of view is 200 degrees (a half angle of view of 100 degrees). An area, in which a half angle of view ranges from 90 through 100 degrees, corresponds to a "peripheral area" of the lens. Of subject images formed in the light receiving surfaces of the image sensors ISb and ISc, image portions formed with half angles of view ranging from 90 through 100 degrees in the wide angle lenses 10b and 10c overlap each other.

Figure 2:
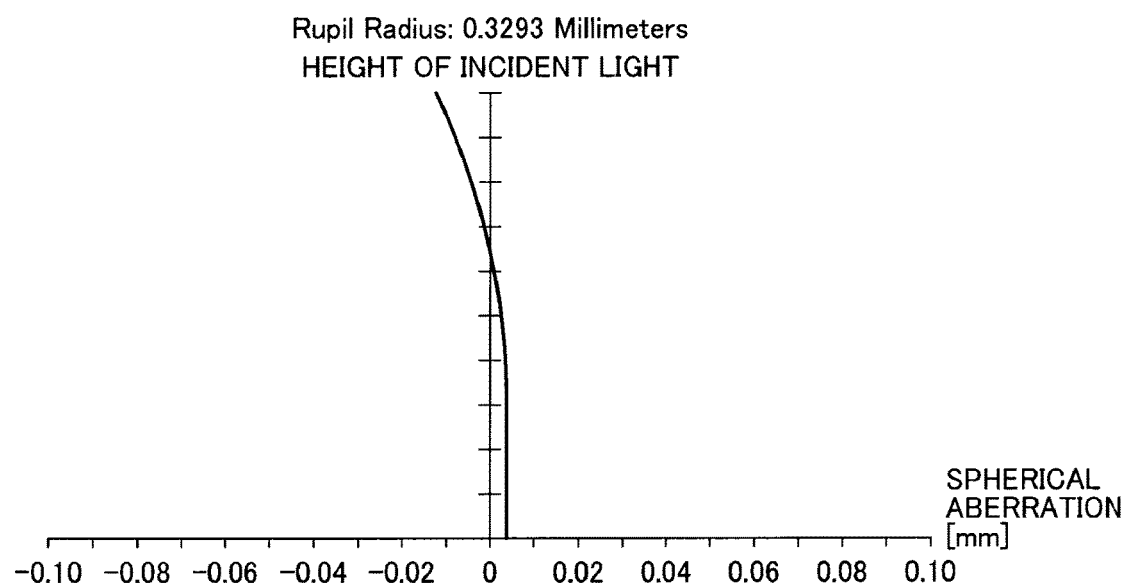
FIG. 2 is a diagram of spherical aberration of a wide angle lens used as a specific example in an optical system of the imaging system.
Figure 3:
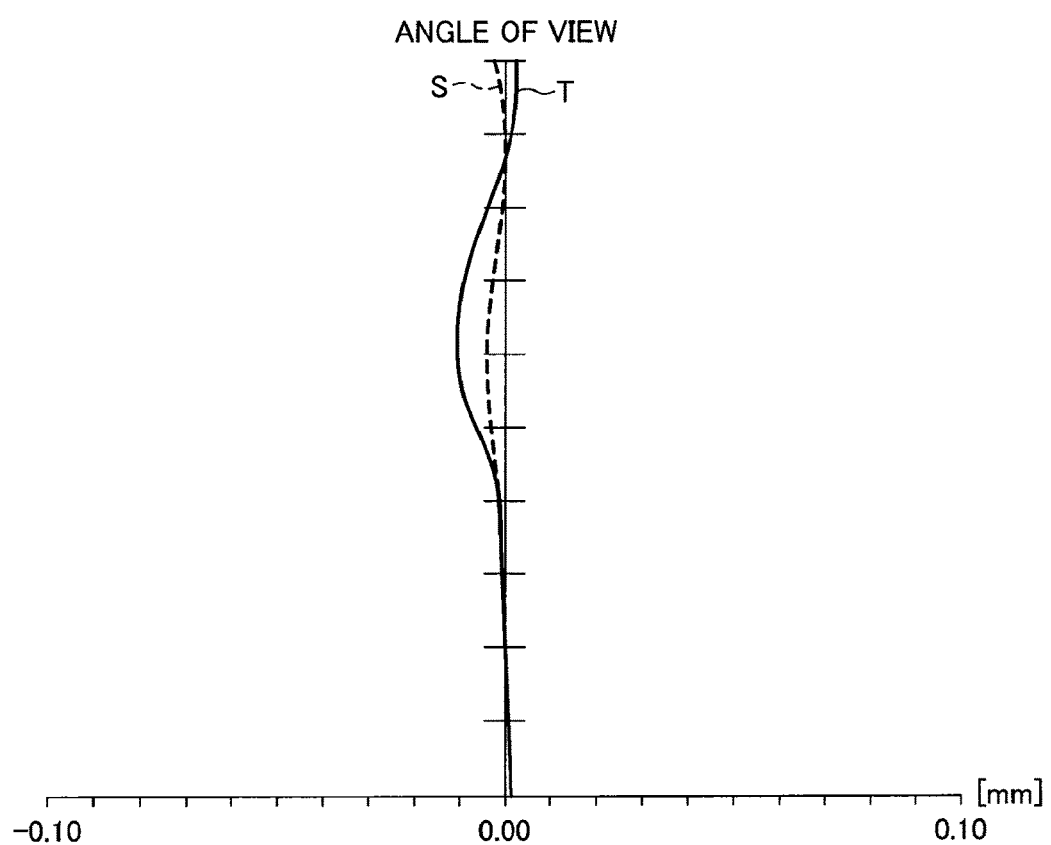
FIG. 3 is a diagram of astigmatism of the wide angle lens used as a specific example in the optical system of the imaging system.
Figure 4:
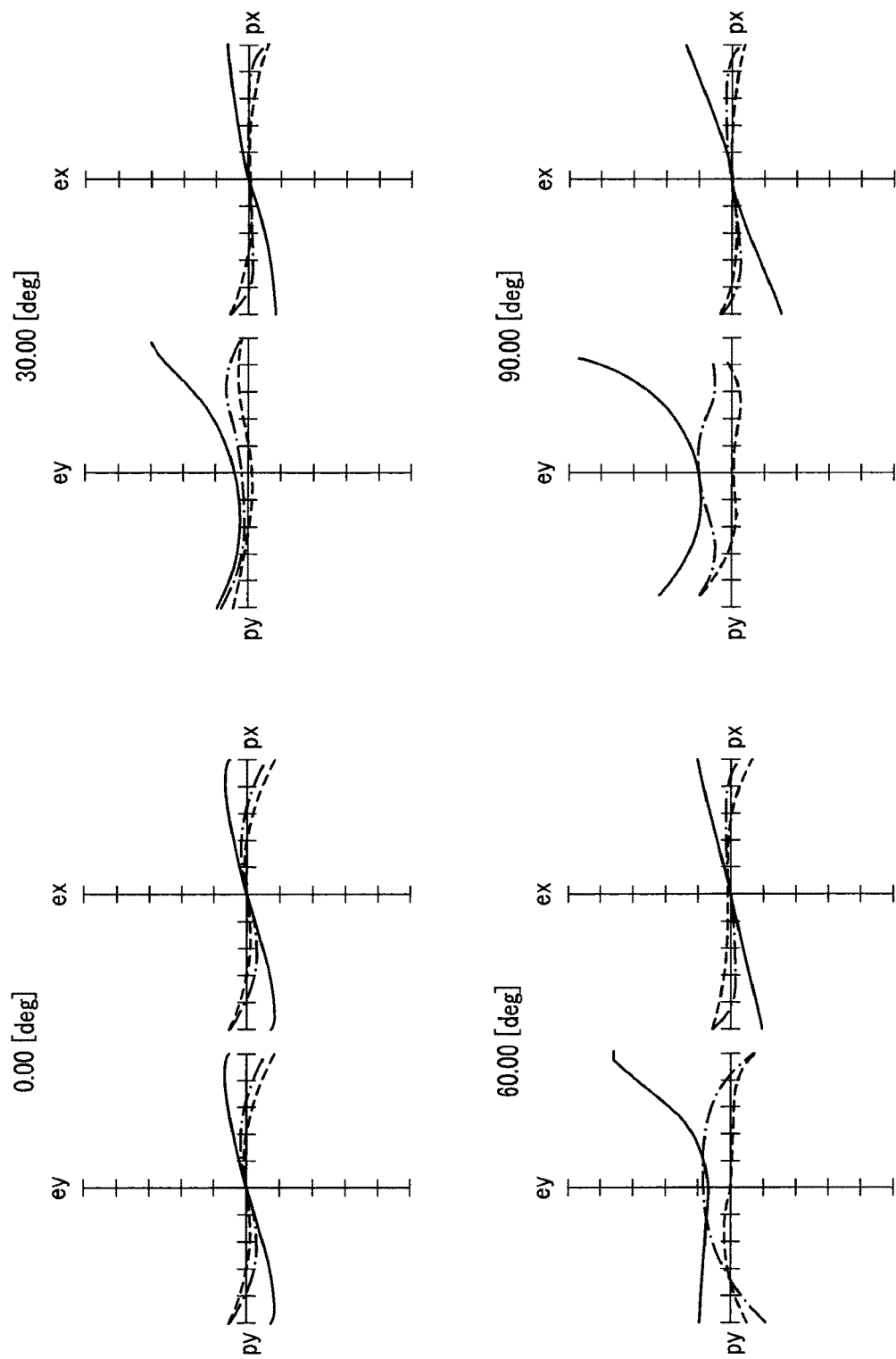
FIG. 4 is a diagram of coma aberration of the wide angle lens used as a specific example in the optical system of the imaging system.

FIGS. 2 through 4 illustrate various types of aberration in the specific wide angle lens 10b (10c). FIG. 2 is a diagram of spherical aberration. FIG. 3 is a diagram of astigmatism. FIG. 4 is a diagram of coma aberration. As is clear from the diagrams, the specific wide angle lens 10b (10c) has a favorable performance.

Figure 5:
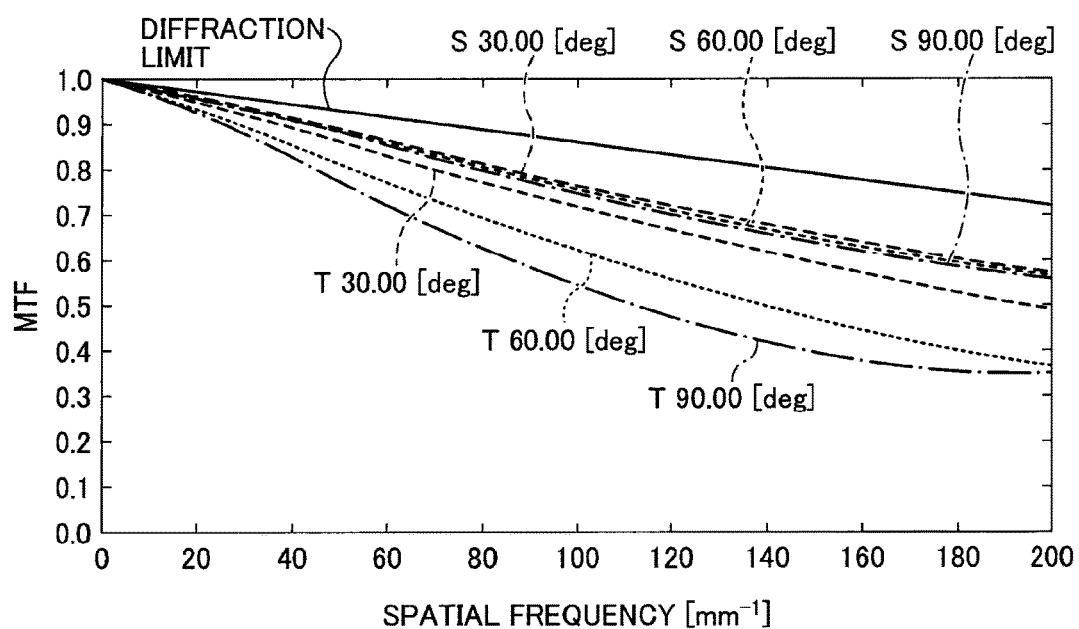
FIG. 5 is a diagram of a modulation transfer function (MTF) of the wide angle lens used as a specific example in the optical system of the imaging system.

FIG. 5 is a diagram of modulation transfer functions (MTF) of the specific wide angle lens 10b (10c) with respect to half angles of view of 30, 60, and 90 degrees in the inside area of the lens. The lateral axis of FIG. 5 denotes spatial frequency (from 0 through 200 in line pair (LP)/mm).

The characteristics of the MTF are represented with respect to the tangential direction indicated by T in the drawing and with respect to the sagittal direction indicated by S in the FIG. 5.

The specific wide angle lens has favorable MTF characteristics. However, with increases in the spatial frequency and half angle of view, the MTF decreases. As a result, the resolution is likely to decrease.

In the present embodiment, a plurality of wide angle lenses constitute the optical system OS. Each wide angle lens has the inside area and the peripheral area. The inside area includes a first area ranging from the optical axis toward the peripheral area and a second area ranging from the outside edge of the first area to the inside edge of the peripheral area of the lens.

In the first area, an image forming magnification of a subject image per unit angle of view is constant. In the peripheral area, the image forming magnification of a subject image per unit angle of view decreases as compared to the inside area of the lens. In the second area, the image forming magnification of a subject image per unit angle of view continuously varies in a direction from the outside edge of the first area toward the peripheral area.

A detailed description is given below.

The optical system OS according to the present embodiment includes two wide angle lenses 10b and 10c of the same technical specification, each having a full angle of view equal to or greater than 180 degrees.

Figure 6:
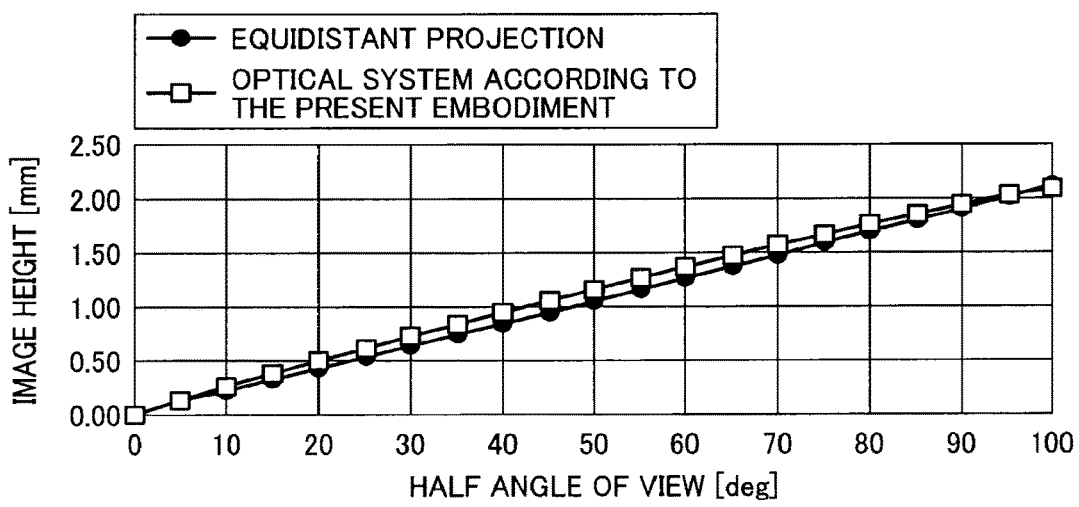
FIG. 6 is an illustration of a projection method of the wide angle lens used as a specific example in the optical system of the imaging system.

FIG. 6 is a diagram of relations between half angles of view and image heights in the wide angle lens as a specific example (specific wide angle lens).

In FIG. 6, the half angles of view and image heights are plotted for the "equidistant projection" and the "optical system according to the present embodiment", respectively.

The "optical system according to the present embodiment" refers to the specific wide angle lens.

In the equidistant projection, with an increase in the "half angle of view" in the lateral axis, the image height linearly increases.

The specific wide angle lens represents almost the same "relations between half angles of view and image heights" as in the equidistant projection, while exhibiting a slight deviation from each other. The specific wide lens is designed to adopt the "equidistant projection in the inside area of the lens". However, actual lens products exhibit a slight deviation in the relations between half angles of view and image heights, from those of the equidistant projection.

In FIG. 6, the image height in the vertical axis is Y, and the half angle of view in the lateral axis is θ. The "image forming magnification per unit angle of view (variation in the image height per unit angle of view)" is dY/dθ.

FIG. 7 is a diagram of the "image forming magnification per unit angle of view (dY/dθ)" in the wide angle lens as a specific example (the specific wide angle lens).

The curve illustrated in FIG. 7 is obtained by differentiating a curve representing the "optical system according to the present embodiment" in FIG. 6 by angle of view (θ).

In FIG. 7, "I" refers to the first area, and "II" refers to the second area. Further, "III" refers to the peripheral area in which the half angle of view ranges from 90 through 100 degrees. "I" and "II" correspond to the inside area of the lens.

As illustrated in FIG. 7, the inside area of the lens includes the first area I ranging from the optical axis (which is 0 in the lateral axis) toward the peripheral area III and the second area II ranging from the end of the first area I to the beginning of the peripheral area III. In the first area I, an image forming magnification of a subject image per unit angle of view is constant. In the peripheral area III, the image forming magnification of a subject image per unit angle of view decreases as compared to the inside area of the lens. In the second area II, the image forming magnification of a subject image per unit angle of view continuously varies in a direction from the end of the first area I toward the peripheral area III.

In fact, the value of "dY/dθ" in the first area I slightly decreases in a direction toward the second area II, which means that the image forming magnification per unit angle of view (dY/dθ) is not exactly constant in the first area I. However, such a case, in which values are considered substantially constant, applies to the case in which "the image forming magnification of a subject image per unit angle of view is constant in the first area I".

As a comparative example relative to the specific example of the wide angle lens (specific wide angle lens), another wide angle lens (hereinafter, referred to as a comparative wide angle lens or a wide angle lens as a comparative example) is prepared, in which the value of "dY/dθ" varies over the entire range of the areas from the optical axis through the peripheral area of the lens, as illustrated in FIG. 8. FIG. 8 illustrates the first area I, the second area II, and the peripheral area III in the same manner as in the specific example (FIG. 7).

In the comparative wide angle lens of FIG. 8, the value of "dY/dθ" increases with a downward-convex curve in the first area I, and monotonically decreases in the peripheral area III. In the second area II, the value of "dY/dθ" continuously varies in a direction from the end of the first area I toward the peripheral area III. That is, the first area I of the inside area in the comparative wide angle lens adopts the stereographic projection.

Figure 9:
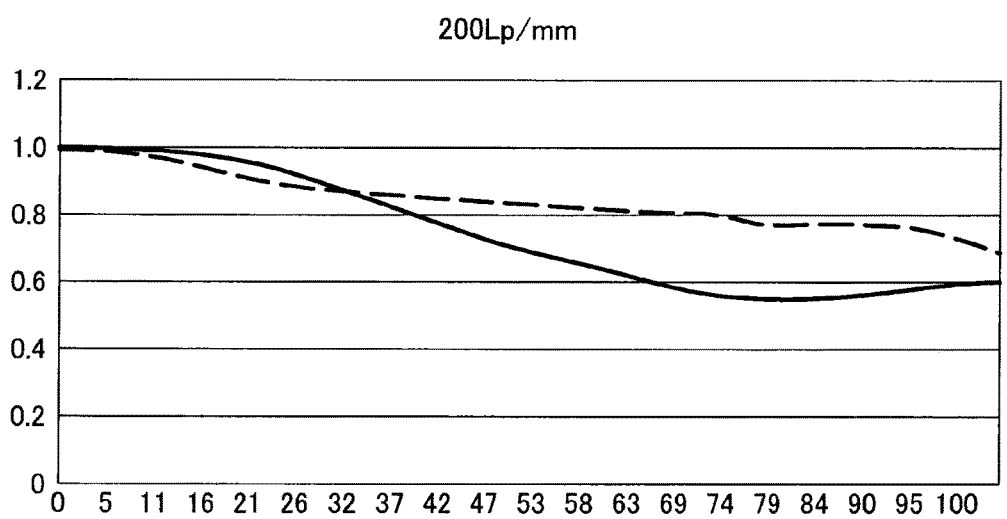
FIG. 9 is a diagram of relations between MTF values with respect to a spatial frequency of 200 LP/mm and half angles of view for a specific wide angle lens and a comparative wide angle lens, respectively.

FIG. 9 is a diagram of relations between MTF values (in the vertical axis) with respect to a spatial frequency of 200 LP/mm and half angles of view (in the lateral axis) for the specific wide angle lens and the comparative wide angle lens, respectively. A solid line and a broken line are used for the comparative wide angle lens and the specific wide angle lens, respectively.

Hereinafter, MTF values with respect to a spatial frequency of 200 LP/mm are referred to simply as "MTF 200". That is, FIG. 9 is a diagram of variations in MTF 200 in accordance with half angles of view in the comparative wide angle lens (indicated by the solid line) and the specific wide angle lens (indicated by the broken line), respectively. In other words, FIG. 9 represents variations in resolution in accordance with half angles of view.

As can be found from FIG. 9, MTF 200, which represents MTF values at a high spatial frequency of 200 LP/mm, decreases with an increase in half angle of view in the comparative wide angle lens. In the specific wide angle lens, MTF 200 remains favorable up to a maximum angle of view.

Figure 10:
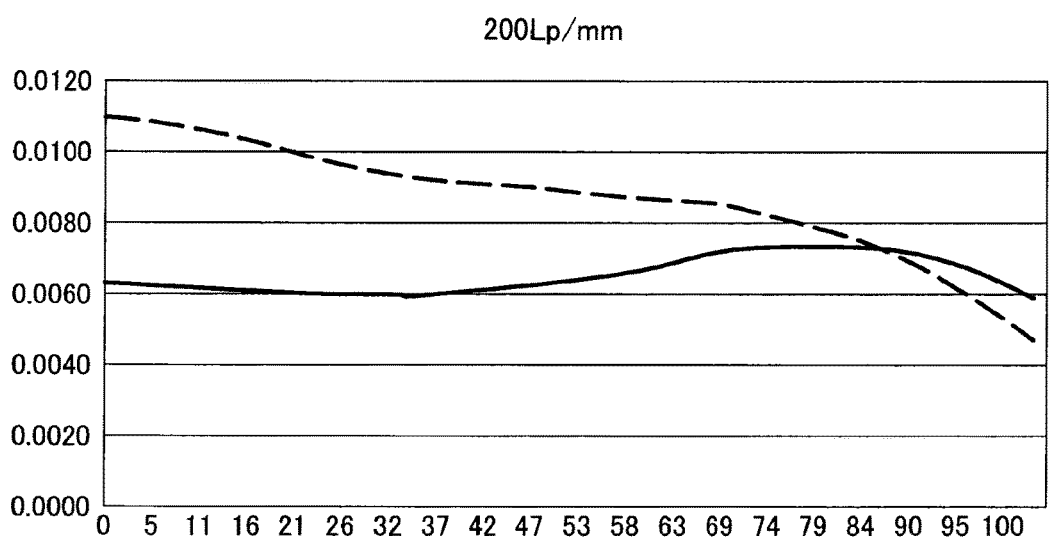
FIG. 10 is a diagram of a resolution for each pixel on a light receiving surface of an image sensor.

Now, referring to FIG. 10, the broken line is obtained by multiplying variation in "image forming magnification per unit angle of view (dY/dθ) in the specific wide angle lens" in FIG. 7 by variation in "MTF 200" in accordance with half angles of view indicated by the broken line in FIG. 9.

The solid line is obtained by multiplying variation in "image forming magnification per unit angle of view (dY/dθ) in the comparative wide angle lens" in FIG. 8 by variation in "MTF 200" in accordance with half angle of vies indicated by the solid line in FIG. 9. The "multiplication of dY/dθ and MTF 200" corresponds to a "resolution for each pixel" on the light receiving surface of the image sensor.

The "resolution for each pixel" in the comparative wide angle lens maintains substantially constant from the optical axis to the outermost edge of the peripheral area of the lens, and slightly increases with an increased half angle of view. That is, the comparative wide angle lens has a high resolution in the peripheral area, thus having a favorable performance.

In contrast, the "resolution for each pixel" in the specific wide angle lens monotonically decreases from the optical axis to the outermost edge of the peripheral area of the lens. The "resolution for each pixel" in the specific wide angle lens is higher over substantially the entire range of the inside area of the lens than the comparative wide angle lens does.

Thus, an actually joined image generated by the specific wide angle lens has a high resolution over the entire area of the image. In view of resolution and projection method of optical systems including wide angle lenses, the resolution is preferably higher over the entirety of the light receiving surface of the image sensor.

Therefore, the optical system according to the present embodiment including the specific wide angle lens has a higher performance than the optical system including the comparative wide angle lens.

As illustrated in FIG. 10, the "resolution for each pixel" in the peripheral area is lower in the specific wide angle lens than the comparative wide angle lens.

However, such a low resolution in the peripheral area of the lens may not adversely affect an actual spherical image to be generated.

This is because image portions formed by the peripheral areas of the lenses overlap with each other, which are not used for an actually generated spherical image. In addition, the overlapped image portions formed by the peripheral areas include a double amount of data with respect to the identical image. This is the same as an increase in light receiving area in a photosensor with respect to the image portions formed by the peripheral areas, which corresponds to an increase in magnification per unit angle of view. Therefore, even with a monotonical decrease in image forming magnification per unit angle of view as indicated by the broken line in FIG. 10, a sufficient amount of data for compensation is obtained to image a spherical image with a uniform quality over the entire 360-degree space.

Further, the image portions formed by the peripheral areas of the respective two wide angle lenses are used as reference data representing the identical image to be joined (stitched) together, thereby generating a spherical image.

The configuration according to the present embodiment achieves a novel optical system including a plurality of wide angle lenses. Further, the configuration according to the present embodiment produces optical systems and imaging systems as described below.

Aspect 1

According to Aspect 1, an optical system OS, includes: a plurality of wide angle lenses 10b and 10c to form subject images, each wide angle lens having a peripheral area III with a decreased image forming magnification per unit angle of view and an inside area ranging from an optical axis to an inside edge of the peripheral area III. The inside area includes a first area I ranging from the optical axis toward the peripheral area III, the first area I having a constant image forming magnification per unit angle of view; and a second area II ranging from an outside edge of the first area I to the inside edge of the peripheral area III. The second area II has an image forming magnification per unit angle of view that continuously varies in a direction from the outside edge of the first area I toward the peripheral area III. An image portion formed by the peripheral area III of a wide angle lens of the plurality of wide angle lenses overlaps with another image portion formed by the peripheral area III of another wide angle lens of the plurality of wide angle lenses. An image portion formed by the inside area of the wide angle lens does not overlap with another image portion formed by the inside area of said another wide angle lens.

Aspect 2

The optical system OS according to Aspect 1, the inside area of each wide angle lens has a equidistance projection.

Aspect 3

In the optical system OS according to Aspect 1 or 2, the plurality of wide angle lenses is two wide angle lenses 10b and 10c each having a full angle of view equal to or greater than 180 degrees.

Aspect 4

In the optical system OS according to Aspect 3, each of the two wide angle lenses 10b and 10c has the same technical specification and has a half angle of view greater than 90 degrees in the peripheral area III.

Aspect 5

In the optical system OS according to Aspect 4, each of the two wide angle lenses 10b and 10c includes a front group having a negative refractive power and a rear group having a positive refractive power.

Aspect 6

In the optical system OS according to Aspect 5, each of the two wide angle lenses 10b and 10c includes, between the front group and the rear group, a transparent body PSb (PSc) as a prism having a reflection surface MSb (MSc) to bend a bundle of rays coming from the front group, toward the rear group. The reflection surface of the transparent body of one of the two wide angle lenses is adjacent to or in contact with the reflection surface of the transparent body of another of the two wide angle lenses.

Aspect 7

In the optical system OS according to Aspect 6, the transparent body PSb (PSc) having the reflection surface MSb (MSc) is a prism.

Aspect 8

An imaging system includes the optical system OS according to any one of Aspect 1 through Aspect 7, and an image sensor to convert light having passed through the optical system OS into an electrical signal to generate an imaged image.

Aspect 9

In the imaging system according to Aspect 8, overlapped image portions formed by the plurality of wide angle lenses are joined to display the imaged image Although the embodiments of the present disclosure have been described above, the present disclosure is not limited to the embodiments described above, and a variety of modifications can naturally be made within the scope of the present disclosure.

The aspects of optical system including two wide angle lenses according to the present embodiment is expanded to general use. That is, in some embodiments, an optical system with n or more numbers of wide angle lenses is applicable, having a full angle of view of A degrees, which is greater than 360/n. The optical system includes a first area with a substantially constant magnification per unit angle of view, a peripheral area with a decreased magnification per unit angle of view, and a second area between the first area and the peripheral area, in which the magnification continuously varies. In this case, n is a natural number not less than 2.

For example, an optical system including three wide angle lenses is used in some embodiments, having a full angle of view of A degrees (e.g., 140 degrees) greater than 360/3 (i.e., 120 degrees for each lens). In the optical system, the wide angle lenses are radially disposed on the same plane, each including an image sensor to constitute an imaging system. With such an optical system, 360-degree horizontal panoramic images are imaged.

Notwithstanding that the images obtained by such an imaging system are not full spherical images, the imaging system capable of imaging horizontal panoramic images is implemented as a vehicle mounted camera or a security camera.

For another example, an optical system including four wide angle lenses is used as a spherical imaging system in some embodiment, having a full angle of view of 140 degrees (A=140). In the optical system, the four wide angle lenses are spatially combined in a radial manner to form a regular tetrahedron. This spherical imaging system images spherical images with a solid angle of $4\pi$ radian.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An optical system, comprising:
   a plurality of wide angle lenses to form subject images, each wide angle lens having a peripheral area with a decreased image forming magnification per unit angle of view and an inside area ranging from an optical axis to an inside edge of the peripheral area,
   the inside area including:
      a first area ranging from the optical axis toward the peripheral area, the first area having a constant image forming magnification per unit angle of view; and
      a second area ranging from an outside edge of the first area to the inside edge of the peripheral area, the second area having an image forming magnification per unit angle of view that continuously varies in a direction from the outside edge of the first area toward the peripheral area,
   wherein an image portion formed by the peripheral area of a wide angle lens of the plurality of wide angle lenses overlaps with another image portion formed by the peripheral area of another wide angle lens of the plurality of wide angle lenses, and
   wherein an image portion formed by the inside area of the wide angle lens does not overlap with another image portion formed by the inside area of said another wide angle lens.

2. The optical system according to claim 1, wherein the inside area of each wide angle lens has an equidistance projection.

3. The optical system according to claim 1, wherein the plurality of wide angle lenses is two wide angle lenses each having a full angle of view equal to or greater than 180 degrees.

4. The optical system according to claim 3, wherein each of the two wide angle lenses has the same technical specification and has a half angle of view greater than 90 degrees in the peripheral area.

5. The optical system according to claim 4, wherein each of the two wide angle lenses includes a front group having a negative refractive power and a rear group having a positive refractive power.

6. The optical system according to claim 5, wherein each of the two wide angle lenses includes, between the front group and the rear group, a transparent body having a reflection surface to bend a bundle of rays coming from the front group, toward the rear group, and
   wherein the reflection surface of the transparent body of one of the two wide angle lenses is adjacent to or in contact with the reflection surface of the transparent body of another of the two wide angle lenses.

7. The optical system according to claim 6, wherein the transparent body having the reflection surface is a prism.

8. An imaging system, comprising:
   the optical system according to claim 1; and
   an image sensor to convert light having passed through the optical system into an electrical signal to generate an imaged image.

9. The imaging system according to claim 8, wherein overlapped image portions formed by the plurality of wide angle lenses are joined to display the imaged image.

* * * * *